United States Patent
Marshall et al.

(10) Patent No.: US 10,729,113 B2
(45) Date of Patent: Aug. 4, 2020

(54) DETACHABLE SPEAR-FISHING BARB

(71) Applicants: Jordan N Marshall, Santa Barbara, CA (US); Robert Paine, Yorba Linda, CA (US)

(72) Inventors: Jordan N Marshall, Santa Barbara, CA (US); Robert Paine, Yorba Linda, CA (US)

(*) Notice: Subject to any disclaimer, the term of this patent is extended or adjusted under 35 U.S.C. 154(b) by 147 days.

(21) Appl. No.: 16/123,171

(22) Filed: Sep. 6, 2018

(65) Prior Publication Data
US 2019/0069530 A1  Mar. 7, 2019

Related U.S. Application Data

(60) Provisional application No. 62/554,998, filed on Sep. 6, 2017.

(51) Int. Cl.
*A01K 81/04* (2006.01)

(52) U.S. Cl.
CPC .................... *A01K 81/04* (2013.01)

(58) Field of Classification Search
CPC ......... A01K 81/04; A01K 81/00; A01K 81/06
See application file for complete search history.

(56) References Cited

U.S. PATENT DOCUMENTS

| | | | | |
|---|---|---|---|---|
| 2,599,626 A | * | 6/1952 | Gottschalk | A01K 81/00 43/6 |
| 3,600,835 A | * | 8/1971 | Hendricks | A01K 81/04 43/6 |
| 4,624,068 A | | 11/1986 | Howard, III | |
| 4,896,450 A | | 1/1990 | Rogers | |
| 5,243,778 A | * | 9/1993 | Henley | A01K 81/04 43/6 |
| 8,677,675 B2 | | 3/2014 | Koch | |
| 2003/0132846 A1 | * | 7/2003 | Hilliard | A01K 11/008 340/573.2 |
| 2006/0042144 A1 | * | 3/2006 | Rogers | F42B 30/14 43/6 |
| 2008/0263931 A1 | * | 10/2008 | Butler | A01K 81/04 43/6 |

FOREIGN PATENT DOCUMENTS

WO    2019043527 A1    3/2019

* cited by examiner

*Primary Examiner* — Christopher R Harmon
(74) *Attorney, Agent, or Firm* — Guy Cumberbatch

(57) ABSTRACT

A spear-fishing tip that combines the strengths of the two most prevalent tips: barbed and slip tip. The tip features the superior hold of the slip tip and the durability of the barb. The tip has a detachable side-located barb which passes through a fish with the spear tip and then pulls away from the tip to remain on the side of the fish opposite that of penetration. The barb includes a longitudinal slot on one side that enables it to lie flush against the side of the tip when impaling a fish and protects it from being damaged during impact. The barb is tethered to the user or the shaft and includes slots received securely on pins radially protruding from the shaft. The slots have rearward openings to allow for detachment when protrusions on a rear end of the barb catch on the flesh of the fish as the tip is pulled from the fish.

20 Claims, 4 Drawing Sheets

DETACHABLE SPEAR-FISHING BARB

RELATED APPLICATIONS

The present application claims priority under 35 U.S.C. § 119 to U.S. Provisional Application No. 62/554,998, filed Sep. 6, 2017, the disclosure of which is expressly incorporated herein.

FIELD OF THE INVENTION

The present application is directed to a spearfishing tip and, more particular, to a detachable barb that more durably retains fish and will not dull or break from use.

BACKGROUND OF THE INVENTION

Spear gun fishing by underwater divers typically involves the use of a gun that propels a spear towards a fish. When the spear pierces the fish, the fish usually flips and turns through violent contortions to free itself of the spear. Unless the spear tip is fashioned with devices to prevent it from being retracted from the fish, the spear may be shaken loose by the contortions of the fish and the catch is lost.

Currently, spear tips on the market break down into mostly two categories: barb (also known as flopper or wing) and "slip tip." The barb or flopper is a piece of metal that sits parallel to the spear a few inches back from the point that can pivot on one end to be perpendicular to the spear, holding a fish from sliding off. U.S. Pat. No. 8,677,675 to Koch disclose the barbed version. The slip tip works differently in that once the fish is speared the point itself detaches, turns a certain amount and holds the fish on a tether or line between the point and the spear. U.S. Pat. No. 4,896,450 to Rogers and U.S. Pat. No. 4,624,068 to Howard, II disclose a spear tip of the "slip tip" variety.

The barb is simple and inexpensive to make and replace but does not hold the fish as well as the slip tip does, and it has a tendency to tear out of objects because of its rigidity, losing the object. Further, particularly strong fish can bend and ruin the shaft while pivoting against the barb. The slip tip is effective for catching fish due to its flexible line but is impractical if there is something hard behind the speared object like a rock or reef because it may break upon impact due to its precision machined male and female parts, making it expensive to manufacture. This makes the slip tip impractical in situations where there is a risk of hitting a hard surface by missing the target or shooting through the target and hitting something behind it, for example a fish hiding under a rock. Plus, the slip-tip versions are somewhat less accurate due to having a less than completely secure point leading the shaft trajectory through the water rather than the rigid shaft itself. This limits the type of fish you can spear with either type of tip, requiring a change of tip setup to accommodate objects that the tip cannot successfully snare, and neither tip giving all of the attributes of accuracy, inexpensive replacement cost, durability, effective retaining of the fish, and effective use in a variety of environments on any species of fish.

SUMMARY OF THE INVENTION

This application presents a spear-fishing tip that is a significant improvement on the two most prevalent tips: barbed and slip tip. The improved tip combines the strengths of both earlier types, which is the superior object retention of the slip tip and the durability, accuracy and cost of the barb, meaning that it is successfully used regardless of targeted species and environments. The present tip also eliminates individual setbacks of the barbed and slip tips.

The exemplary spear-fishing tip has a side-mounted barb that detaches from the side of an elongated shaft, whether it uses pins, is shaped to just come into contact with the shaft, or otherwise. The barb is slidably and removably attached to one side of the shaft and is tethered to the shaft or a user. The barb remains attached to the shaft when experiencing a proximal force from the direction of the shaft point to the rear, such as when passing through a fish, and detaches when experiencing a distal force oriented toward the point to the front, such as when the shaft is retracted from within the fish.

The exemplary tip comprises a detachable barb that is located on the side of the spear and designed in a way that it remains connected when subjected to a force coming toward it from the point, but detaches when subjected to a force applied to it toward the point of the spear. The detachable barb is tethered to the shaft with a line that keeps tension holding it on until it has impaled an object. These features operate in such a way so that once the fish is shot and slides down the spear then begins to go back toward the point the detachable barb detaches and remains on the opposite side of the hole in the fish from the point of impaling, and holds the fish between it and a line attached to the spear, effectively retaining it until removed by the user.

Because of the location of the detachable barb on the side and design of the detachable component this works better than slip tips because those break upon hitting hard surfaces, are expensive to replace, and inaccurate. This can be used in more environments than the slip tip because the slip tip will break if it makes contact such items as rocks or a reef.

The present tip also works better than tips that use an attached barb because those give the fish too much to pivot against, therefore increasing the probability of the fish tearing off and getting away, making larger fish especially hard to retain once shot. The present tip utilizes the shaft as the spear point rather than a detachable point, which makes it durable and accurate due to its rigidity and location, and utilizes a detachable barb tethered to the shaft, which is very efficient at keeping a fish once it has been speared. The detachable barb has the cost effectiveness, durability, and accuracy of the traditional barb combined with the superior hold of the slip tip, which allows it to accurately, inexpensively, and dependably be used to shoot and keep any species of fish in any situation.

BRIEF DESCRIPTION OF THE DRAWINGS

Features and advantages of the present invention will be appreciated as the same become better understood with reference to the specification, claims, and appended drawings wherein:

FIGS. 4A-4F are various orthogonal views of the spear-fishing tip of the present application.

DETAILED DESCRIPTION OF THE PREFERRED EMBODIMENTS

The present application provides an improved spear-fishing tip which combines the superior hold of the slip tip and the durability of the barb. For the purpose of explanation, the directions "distal" and "proximal" refer, respectively, to directions away from and toward a user of the spear-fishing tip. In this nomenclature, "distal" is synonymous with forward or front and "proximal" is synonymous with rearward or rear.

Figure 1A:
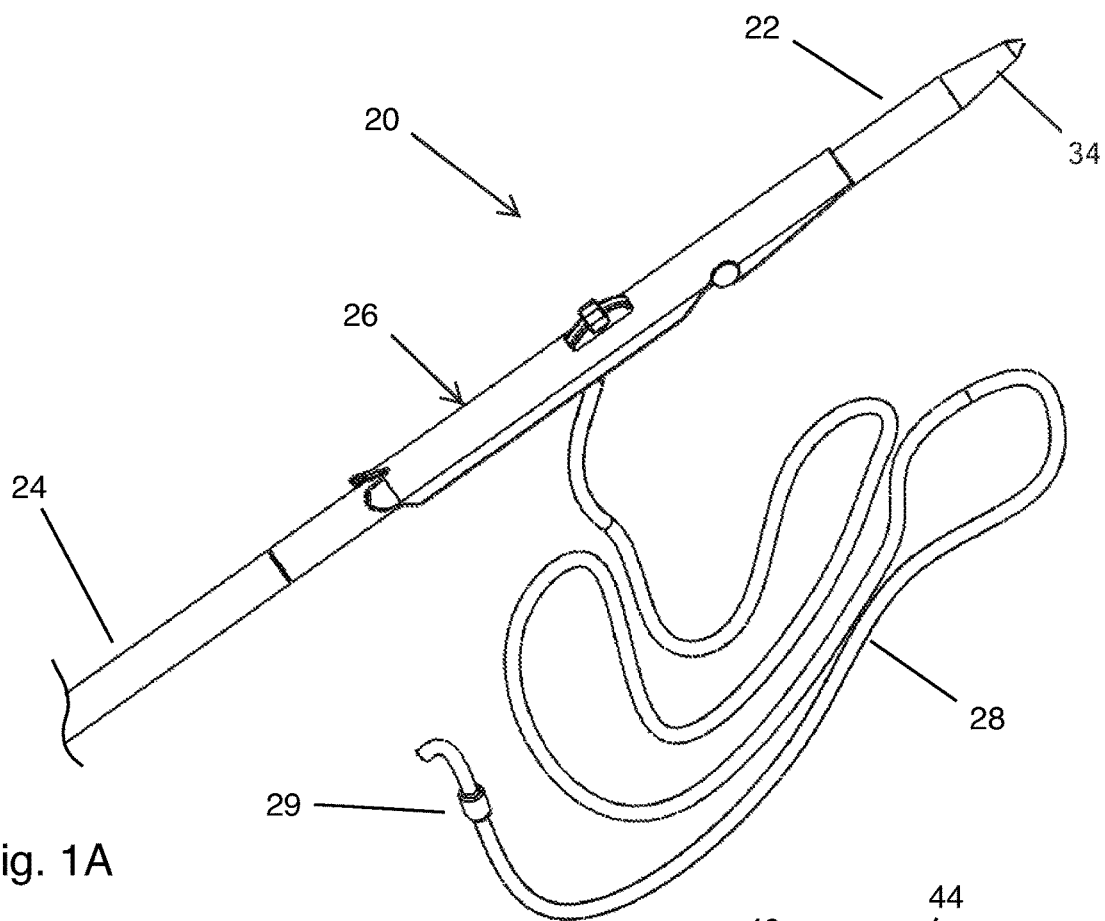
FIG. 1A is a perspective view of an assembled spear-fishing tip of the present application.
Figure 1B:
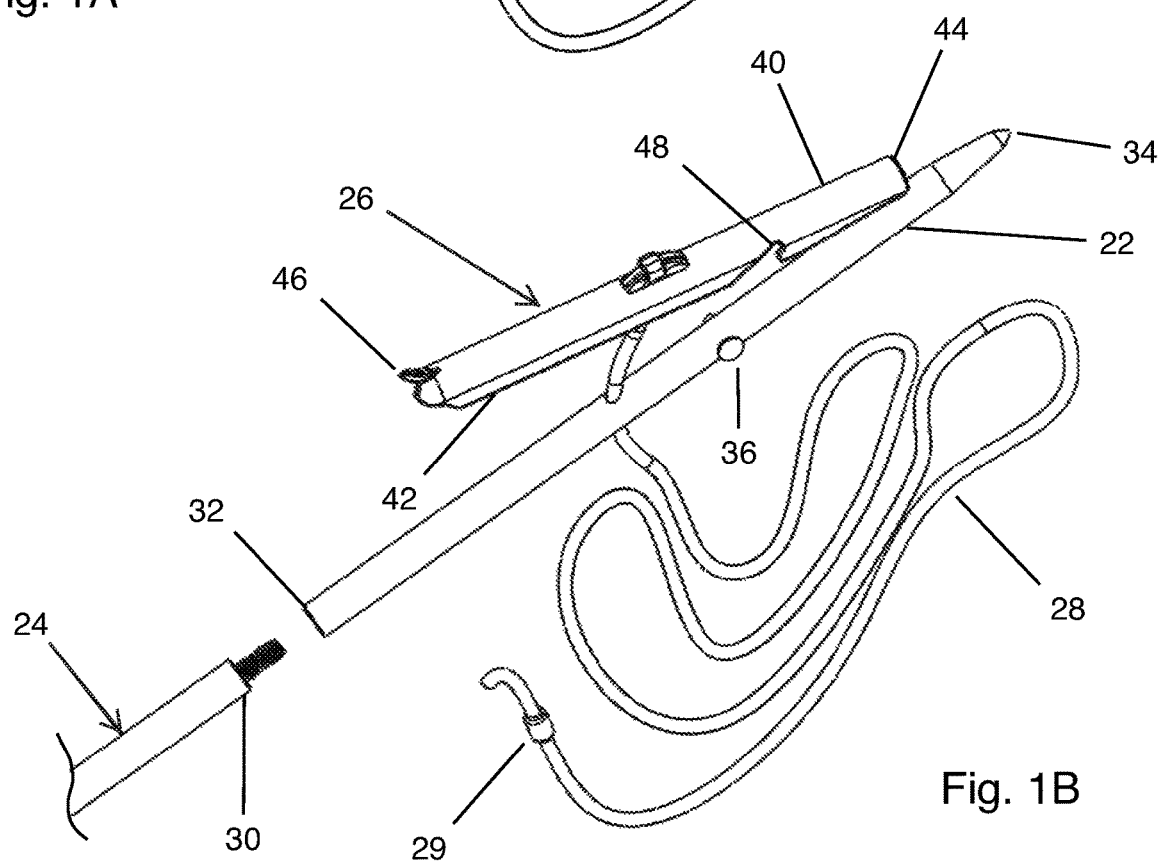
FIG. 1B is a perspective view of the spear-fishing tip with the separate parts exploded.

With reference now to FIGS. 1A and 1B, perspective views of an exemplary spear-fishing tip 20 of the present application are shown both assembled and with separate parts exploded. The spear-fishing tip 20 comprises an elongated, generally cylindrical point 22 connected in series to a distal end of an elongated shaft 24. A detachable side-mounted barb 26 is temporarily secured to one side of the point 22 and has a line or tether 28 connected thereto. A knot or other such enlargement 29 may be provided on the rearward end of the tether 28 for securing to a proximal end of the shaft 24, a belt of the user (not shown), or other such point of anchorage. The enlargement 29 on the rearward end of the tether 28 provides a safety that prevents the tether from being pulled completely through the point 22.

As seen exploded in FIG. 1B, the shaft 24 may have a male threaded post 30 on its distal end which fits within a female bore 32 in the proximal end of the point 22, although other removable connections are contemplated. It should also be noted that although a removable point 22 is preferred so that it may be replaced when dulled, the point could be an integral forward end of the shaft instead. The term pointed forward end thus refers to the point 22 on the spear-fishing tip 20 whether it is removable or not. As mentioned, the point 22 has a generally cylindrical body that terminates in a sharp distal tip 34 for piercing fish. Midway along the point 22, an anchor pin 36 passes diametrically across the cylindrical body, preferably perpendicular to its axis. The entire length of the point 22 is desirably between about 10-15 cm.

The detachable side-mounted barb 26 has a partial tubular body 40 that is interrupted on a lower radial side by a pair of separated axial edges 42 so as to create a longitudinal opening along the length of the underside of the barb leading to a generally cylindrical cavity (not visible) that allows it to be placed lengthwise onto the shaft. Alternatively, the barb 26 may be formed as a rectangular channel shape with a top and two lateral sides.

Figure 4B:
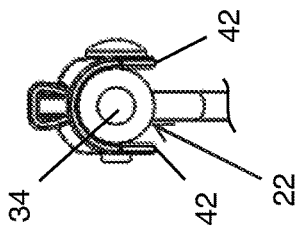
Figure 4B:
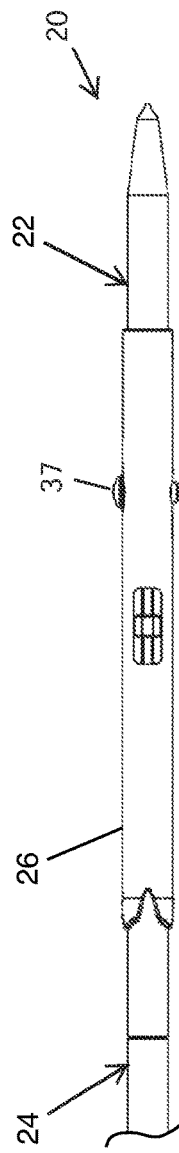
Figure 4A:
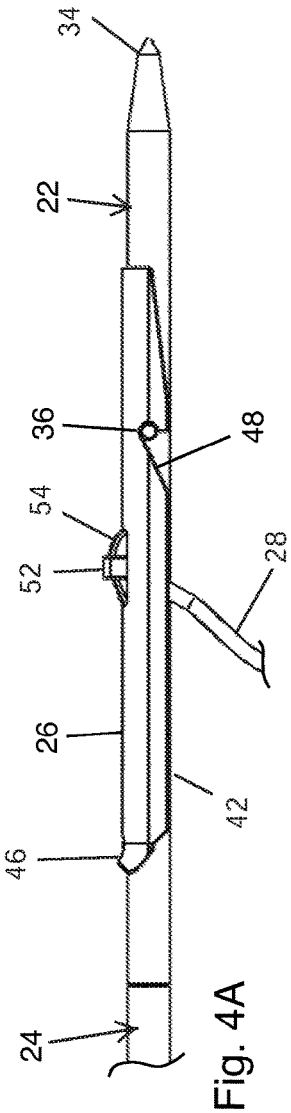
Figure 4C:
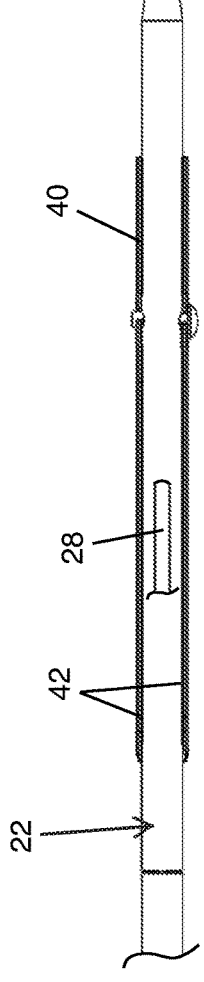
Figure 4F:
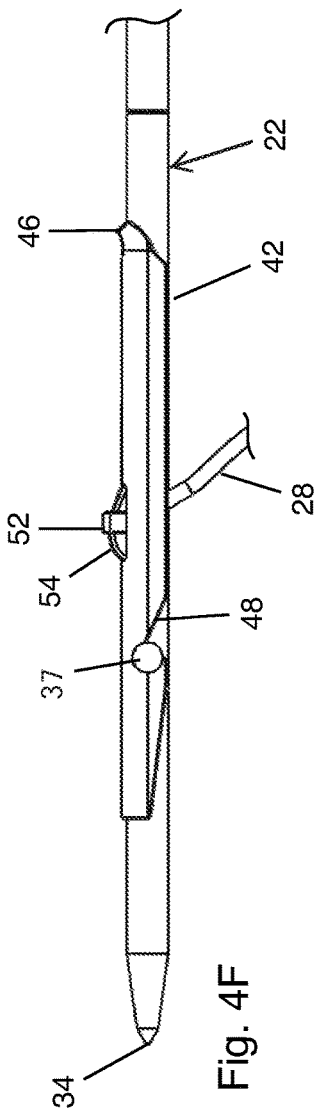
Figure 4E:
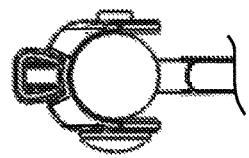

FIG. 4D shows the axial edges 42 extending on both sides of the cylindrical point 22 which allows the cylindrical cavity of the barb 26 to surround and lie flush against the of the point. That is, the cylindrical cavity of the barb 26 has an ID that is approximately equal to or slightly larger than the OD of the cylindrical body of the point 22. The spacing between the axial edges 42 is approximately the same as the diameter of the point 22, although the edges may be spaced apart slightly less than the point diameter to provide a small holding force. Likewise, the partial tubular body 40 may extend around greater than 180° so that the axial edges 42 wrap slightly around the cylindrical body of the point 22 when the barb 26 engages the point. Another possible option is to machine or otherwise form a recessed region along the point 22 that closely receives the barb 26 such that the OD of the shaft lies flush with the adjacent larger diameter portions of the barb and is thus streamlined to better pass through water. Ultimately, the barb 26 is supposed to relatively easily break free from the point 22, and thus the holding force should not be excessive.

Figure 3:
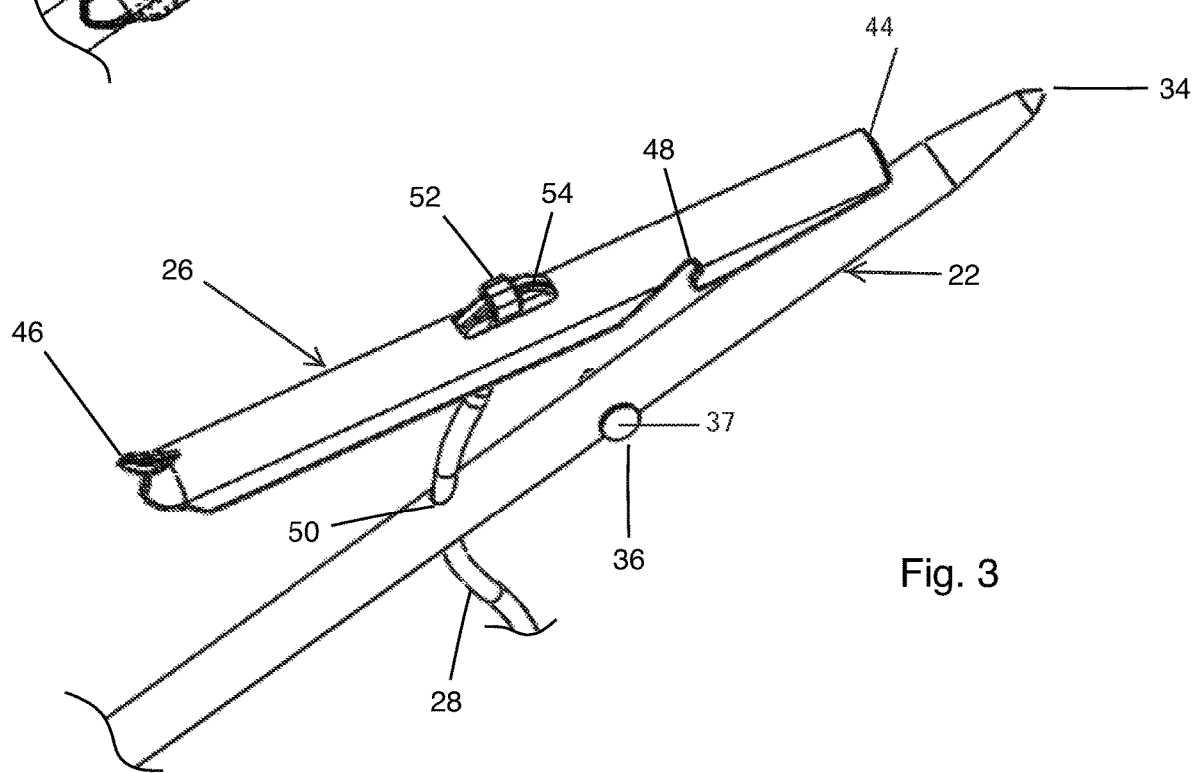
FIG. 3 is an enlarged view of the spear point with the detachable barb exploded therefrom.

With reference to FIGS. 1B and 3, the detachable side-mounted barb 26 has a distal end 44 that preferably lies perpendicular to the axial direction so as to be blunt. A pair of outwardly splayed wings or projections 46 are provided on the proximal end of the barb 26, whose purpose will be described below. The axial length of the barb 26 between the distal end 44 and splayed projections 46 is desirably between about 9-12 cm, and in all cases shorter the length of the point 22. In one embodiment, the detachable barb 26 is formed of a non-corrosive metal such as 304 stainless steel or aluminum, and the partial tubular body 40 and the splayed projections 46 are stamped as an integral piece. A wall thickness of the barb 26 is between about 0.8-1.2 mm.

The barb 26 is secured to the point 22 via interaction between angled slots or cutouts 48 in both of the axial edges 42 and the anchor pin 36. Specifically, the anchor pin 36 forms elements that project laterally outward on both sides of the body of the point 22 such that they fit within the angled cutouts 48, which are disposed flush against the exterior wall of the point 22. It should be understood that although the lateral elements are desirably formed on either side of the point 22 by the anchor pin 36, they may also be formed by separate elements secured such as by welding to the point. In an exemplary embodiment, at least one of the lateral elements formed by the anchor pin 36 includes a shaft stub and an outer head 37, much like a rivet head. This helps maintain engagement of the barb 26 on the point 22 by keeping the portions of the barb on that side of the cutouts 48 from flexing radially outward off of the lateral elements. Another option is to cover each cutout 48 with a piece of metal (not shown) welded over the cutout, to further help prevent the barb 26 from flexing off of the anchor pin 36. (In order to strengthen the area where the cutout was made). Another option is to machine the cutout through only a portion of the thickness of the barb 26, leaving a material cover on the exterior of the barb but still allowing it to engage securely with the pins.

The cutouts 48 are angled such that they open in a generally proximal direction, perhaps at a 30° angle from the longitudinal axis. This provides resistance to proximal movement of the barb 26 relative to the anchor pin 36 and point 22, but permits the barb 26 to be pulled upward away from the point 22 when subjected to relative distal forces. This permits the barb 26 to detach from the point 22 after the spear-fishing tip 20 passes through a fish, as will be explained. The cutouts 48 are preferably located between an axial midpoint of the barb and the distal end 44 of the barb, such as for example a distance of between about 0.3-3.0 cm from the distal end 44.

As seen in FIG. 3, the cylindrical point 22 may have single radial through bore 50 through which the tether 28 passes, as seen best in FIG. 3. A single length of the tether 28 may extend through the lower slot in the barb 26 defined by the axial edges 42 and secure at a loop or knot 52 to a cleat 54 provided on an upper side of the barb body 40. In one embodiment, the cleat 54 is formed by cutting and bending out the material of the tubular body 40 that spans an opening formed in the upper side of the body of the barb 26. In an alternative, the cleat 54 is a separate welded piece that extends across a slot in the barb 26 as opposed to being formed from a bent out side wall of the tubular body 40. In either case, the barb 26 has a single opening or slot in its top side through which the tether 28 passes. In an alternative embodiment described below, no such openings or slots are formed in the barb. The cleat 54 is desirably located near an axial midpoint of the barb 22 such that when the barb detaches behind a fish it is less likely to be pulled through the hole formed in the fish (i.e., the barb lies perpendicular against the backside of the fish with the tether 28 extending through the hole in the fish formed by the point 22).

Figure 2:
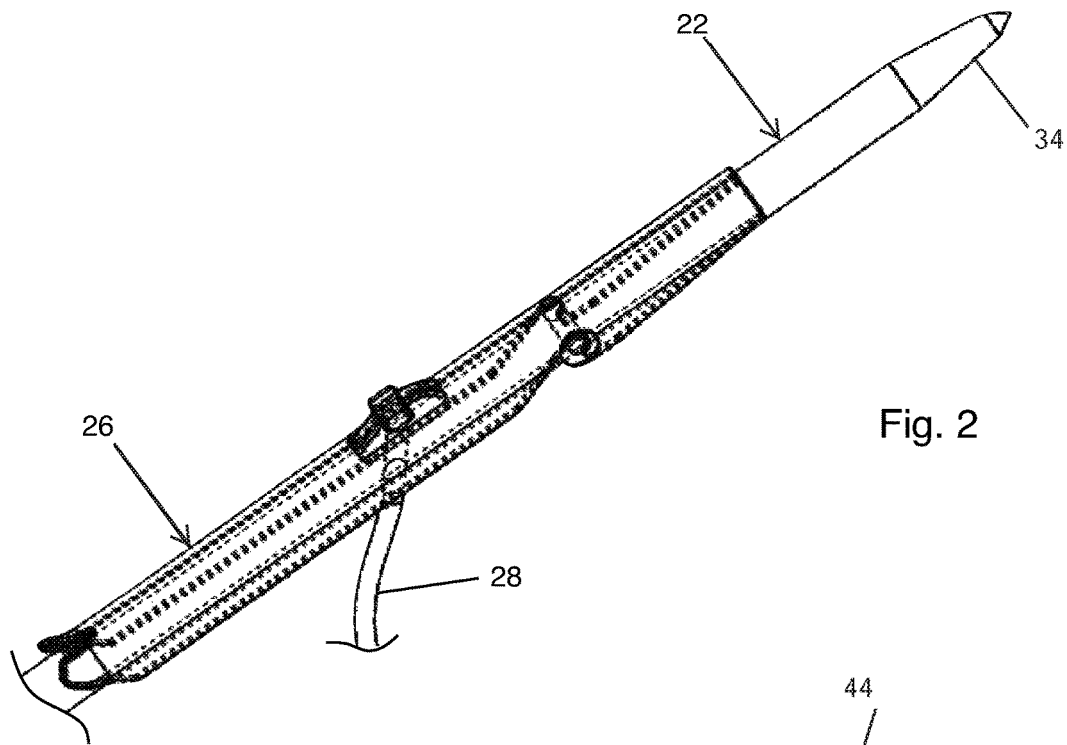
FIG. 2 is an enlarged view of a spear point of the assembled spear-fishing tip showing a detachable side-mounted barb in phantom.

Referring back to FIG. 1, and also FIG. 2, the barb 26 lies flush against the cylindrical point 22 when assembled. The entire structure is very streamlined, terminating in the sharp tip 34. Propulsion of the spear-fishing tip 20 by various means (manual, elastic band, gas expansion, etc.) enables the user to spear a fish. Typically, the entire point 22 along with the detachable barb 26 passes through the entire fish. Upon retracting the tip 20, or through fish movement, the tip 20 pulls out of the fish. The rearwardly-splayed projections 46 catch on the flesh or backside of the fish during retraction of the tip 20 which pulls the barb 26 in a distal direction relative to the point 22 (the point being secured to the shaft 24). As mentioned above, because the cutouts 48 are angled in a rearward direction, there is no significant resistance to detachment of the barb 26 from the cylindrical point 22. Consequently, the barb 26 remains on the backside of the fish and is connected to the user by the tether 28. The distal end 44 of the barb may contact the point 22 so that the cutouts 48 located between an axial midpoint of the barb 26 and the distal end are pulled laterally off the anchor pin 36. However, the angle of the cutouts 48 ensures detachment of the barb 26 from the point 22 even if the forces from the fish's body are primarily axial. The cutouts 48 simple slide off the anchor pin 36.

It should be noted that the rearwardly-splayed projections 46 may be formed on the proximal end of the barb 26, as shown, or may extend outward from the partial tubular body 40, or both. That is, the rearwardly-splayed projections 46 stick out from the partial tubular body 40 and the point 22, and thus catch on the backside of the fish which generates the force to detach the barb 26 from the point 22. However, the projections 46 may be replaced or supplemented with rearwardly-angled tabs, barbs or otherwise projections (not shown) along the partial tubular body 40. In a preferred embodiment, the rearwardly-splayed projections 46 extend radially outward from the otherwise longitudinally-oriented body 40 by a distance of between about 5-15 mm. The projections 46 are desirably rounded on their edges so as not to embed into the flesh of the fish, and may be angled outward from the body 40 by 30-90°. Though projections 46 that stick out perpendicularly may work, an angle to them helps leverage the barb 26 off of the point 22 as the point moves backward through the hole in the fish.

Figure 5:
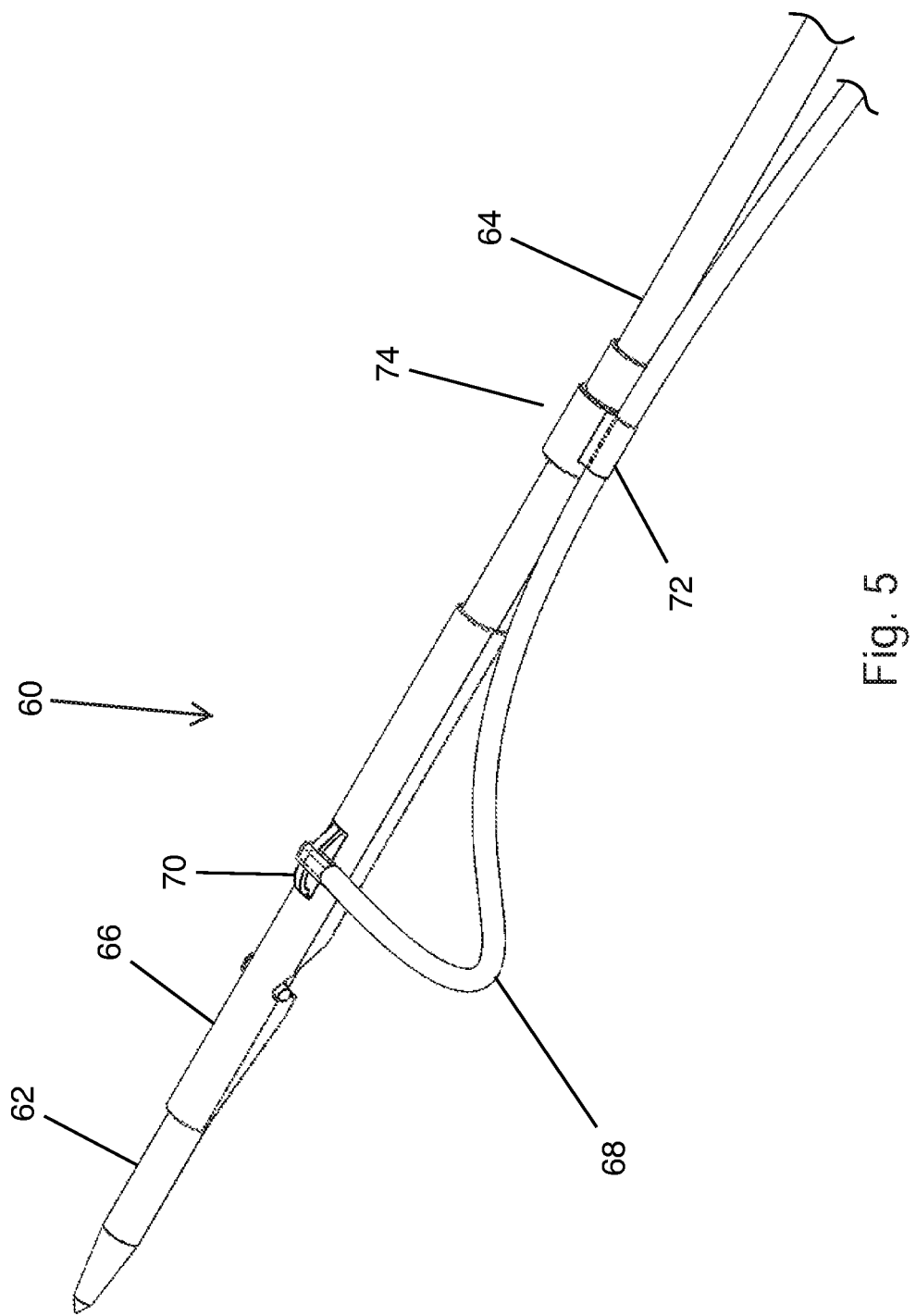
FIG. 5 is a perspective view of an alternative spear-fishing tip having a slide ring to which a tethered line attaches.

FIG. 5 is a perspective view of an alternative spear-fishing tip 60. As before, a sharpened cylindrical point 62 aligns with and connects in series at the distal end of the shaft 64, and the same detachable barb 66 is temporarily secured to the point. In contrast with the first embodiment, a line or tether 68 connects directly to the cleat 70 on an upper side of the barb 66 without passing through the body of the point 62, and thus there is no aperture needed through the point 62 aside from one that receives an anchor pin, as explained above. As explained above, the cleat 70 may be formed from a bent out side wall of the body of the barb 66 or may be a separate welded piece that extends across a slot in the barb 66. The tether 68 is secured via a crimped sleeve 72 or other such device to a tubular slide ring 74 free to slide along the shaft 64. Preferably, a rearward end of the tether 68 passes through the slide ring 74 and has a knot or other such enlargement preventing it from being pulled out of the slide ring.

The alternative spear-fishing tip 60 functions in essentially the same manner as described above, though the line 68 does not pass through a bore in the point 62 which reduces friction.

In the construction of the exemplary spear-fishing tip, a number of preferred components include:

- a metal half cylinder (or similar shape) with a slot for a pin near one end and a flared barb on another, with a place to tie the line centered on its top. This piece straddles the spear parallel to the spear, and is located close to the point. The slot is closed to one direction and open to another in order to keep the barb hugging the spear when passing through an object but detaching when the object comes from the other direction. It also has a feature to tie a line to.
- a line that connects the detachable flopper to a slide ring or shaft
- a component that connects the line to the shaft, for example a hole perpendicular through the shaft that the line passes through. Another example is a slide ring, which is a short tube that is on the spear, with an interior cross section similar but slightly larger than the spear, allowing it to move freely along the length of the spear. It typically has a hole or means of attaching the line to it.
- a spear, with a point on one end and a hole that is horizontal to the spear's orientation and perpendicular to the length of the spear, (typically a few inches from the point), and typically (not always) with a line to the back end of the spear which remains in possession of the user for tension
- a pin that sits in the hole perpendicular to the length of the shaft, protruding enough for the pin slots on the detachable spear to make contact The components arranged like this:

The spear is a base, with all other pieces placed on, through, or near it.

At one end of the spear is a point. At a distance from that point is a hole through the spear that is horizontal to the length of the spear. In that hole there is a pin, and on that pin the detachable barb is placed, with the pin sitting in the slot of the barb, and the detachable barb straddling the spear lengthwise.

On the opposite side of the point from the barb the slide ring sits, which is connected to the detachable barb with a line of some sort. (or there is a line passing through the shaft itself, which is shown below).

Near the opposite end of the point on the spear there is often a line connected to spear, which is possessed by the user in some fashion (typically connected to a secondary object in their possession to hold tension).

The invention works like this:

An object (a fish for example) is impaled on a spear far enough to so that the detachable barb also passes into and even through the object.

The object has a possibility of coming off the spear, so it needs a device to retain it.

If the impaled object moves back toward the point of the spear it contacts the outward flayed parts of the detachable barb which rests on the spear pins, causing it to move off the pins and detach completely from the shaft.

The detachable barb rotates some amount, and as the object passes off the spear the detachable barb remains opposite the side of initial penetration.

The object now is held between the line that connects the spear to the barb (more specifically the slide ring to the barb), with the spear on one side of the object, the barb on the opposite side, and the connecting line passing through the hole in the object, effectively anchoring the object to the spear.

The slide ring or line hole on the spear then keeps the object connected to the spear. The slide ring cannot pass the pins on the shaft, and the line has a knot tied opposite the direction of the barb the preventing it from coming completely through either the shaft or the slide ring (depending on variation).

This process is similar to the current slip tip method, with the exception of the detachable component of the spear:
- being located on the side of the spear rather than at the point
- holding to the pins perpendicular to the spear rather than male and female connections in line with the spear.
- shaped to hug the side of the spear rather than sit at the point of the spear.
- not being the spear point but relying on the shaft to provide the spear point.

The things that are already being employed by the slip tip that this device shares:
- a slide ring
- a line attaching it to the shaft
- a spear This process is similar to the current slip tube method, with the exception of the detachable component of the spear:
- being located on the side of the shaft rather than a tube fitting over the shaft
- detaching after being displaced a very small distance rather than having to travel the remaining length of the spear
- shaped and designed to hug the side of the spear rather than as a sleeve over it
- can be designed to fit flush to the shaft, which will inhibit the deploy of the slip tube if attempted on it
- can accommodate a line through the shaft directly under the line hole on the detachable barb, which is not practical or possible with the slip tube
- does not have a closed circular cross section There are at least two alternatives that can also be employed to this invention:
- Instead of using a slide ring, the line can pass through another hole in the spear that is roughly perpendicular (can be 45 degrees etc.) to the spear. Or, the line can attach to a stationary ring instead of a slide ring
- Instead of being directly attached to the spear, it is common that a spear has a threaded end instead of a point. In this case a length of spear with an end threaded complementary to the threaded spear is used, with point on the end opposite the thread. The above system would be virtually identical to the non-threaded case, except have the possibility of changing out the entire system for a different threaded tip (common practice in spearfishing).

Some alternative options currently being considered:
Threaded tip with slide ring
Threaded tip without slide ring (line through shaft or tip)
Pointed one piece shaft with slide ring
Pointed one piece shaft without slide ring (line through shaft or tip)
Variations that may be included:
The way that the detachable barb stays on the shaft (for example pins from the barb can fit onto the shaft, or pins from the shaft can fit onto the barb, one protrusion from the pin can be used or both, a piece of the detachable barb can fit into a slot on the shaft, pins can be replaced by a line or cable, etc.).

The exact shape of the detachable barb (it can be a half cylinder, have a square cross section, have a "U" cross section, be completely flat, have a non-uniform cross section, have jagged edges to increase hold, have protrusions, etc.

The way the line connects the barb to the shaft, and the way the line connects to the detachable barb (slide ring, stationary ring, line through the shaft, line coming off the top of the detachable barb, line coming off the bottom, line going through the pin slot, line held by the user etc.)

The shapes, locations and number of the rear protrusions may vary.

The shape of the pin slots/cutouts can vary.

The shape of the spear shaft can be adjusted to fit the detachable barb in a more streamlined way, through machining a recess that fits the barb to create an equal OD with the shaft and the barb.

The number of detachable barbs employed can be varied (for example two detachable barbs with one fitting on top and another on the bottom onto the same pin, multiple detachable barbs located at different points on the shaft, multiple barbs that are connect and stay connected as they deploy, etc.)

The height, width, length and size of the detachable barb can be varied to accommodate any size shaft.

While the invention has been described in its preferred embodiments, it is to be understood that the words which have been used are words of description and not of limitation. Therefore, changes may be made within the appended claims without departing from the true scope of the invention.

What is claimed is:

1. A spear-fishing tip, comprising:
an elongated shaft with a pointed forward end terminating in a sharp front tip;
a side-mounted barb detachably secured to an outside wall of the pointed forward end, the barb having an axially-extending body forming an axial slot on one side that fits around a length of the pointed forward end and a front end of the barb being spaced from the sharp front tip, the body defining a pair of cutouts;
lateral elements fixed to and projecting outward on opposite sides of the pointed forward end, wherein the lateral elements are received by the cutouts on the barb, and when so received the cutouts are configured to permit forward movement of the barb with respect to the lateral elements and pointed forward end but prevent rearward movement of the barb with respect to the lateral elements and pointed forward end;
outward projections on the body of the barb configured to catch on a body of a fish after the pointed forward end and barb have passed through the fish and thus exert a forward force on the barb with respect to the pointed forward end; and
a tether having a forward end anchored to the barb.

2. The spear-fishing tip of claim 1, wherein the lateral elements are formed by a pin passing diametrically through an aperture perpendicular to the length of the shaft formed in the pointed forward end, and wherein the pair of cutouts are formed between an axial midpoint of the barb and the front end of the barb.

3. The spear-fishing tip of claim 1, wherein the barb defines a pair of separated axial edges on a lower radial side, and the cutouts interrupt the axial edges at a rearwardly-directed angle.

4. The spear-fishing tip of claim 3, wherein the cutouts are located a distance of between about 0.5-3.0 cm from the front end of the barb.

5. The spear-fishing tip of claim 1, wherein the outward projections on the body of the barb are rearwardly-angled.

6. The spear-fishing tip of claim 5, wherein the outward projections are located at a rear end of the detachable barb.

7. The spear-fishing tip of claim 1, wherein the barb has a cleat located near an axial midpoint of the barb to which the forward end of the tether is anchored.

8. The spear-fishing tip of claim 7, further including a slide ring slidably coupled to the shaft, wherein a rearward end of the tether is attached to the slide ring.

9. The spear-fishing tip of claim 1, further comprising an aperture through the shaft that is slightly larger than the diameter of the tether, wherein the forward end of the tether passes through the aperture before being anchored to the barb.

10. The spear-fishing tip of claim 9, wherein a rearward end of the tether has a knot or enlargement preventing it from being pulled through the aperture.

11. A spear-fishing tip, comprising:
an elongated cylindrical shaft connected in series to a cylindrical point terminating in a sharp front tip;
a side-mounted barb detachably secured to an outside wall of the point, the barb having a partial tubular body with spaced longitudinal edges sized to fit closely around the point, the barb having a pair of cutouts formed opposite each other in the longitudinal edges;
lateral elements fixed to and extending outward on both sides of the point that are received by the cutouts on the barb, wherein the cutouts are angled to permit forward movement of the barb with respect to the pointed forward end but prevent rearward movement of the barb with respect to the pointed forward end; and
a tether having a forward end anchored to the barb.

12. The spear-fishing tip of claim 11, wherein the lateral elements are formed by a pin passing diametrically through an aperture perpendicular to the length of the shaft formed in the point, and wherein the pair of cutouts are formed between an axial midpoint of the barb and a front end of the barb.

13. The spear-fishing tip of claim 11, wherein the cutouts interrupt the axial edges at a rearwardly-directed angle.

14. The spear-fishing tip of claim 13, wherein the cutouts are located a distance of between about 0.5-3.0 cm from a front end of the barb.

15. The spear-fishing tip of claim 13, wherein the barb has rearwardly-angled outward projections on the body configured to catch on a body of a fish after the point and barb have entered or passed through the fish and thus exert a forward force on the barb with respect to the pointed forward end so as to push the angled cutouts from around the lateral elements and detach the barb from the pointed forward end.

16. The spear-fishing tip of claim 15, wherein the outward projections are located at a rear end of the detachable barb.

17. The spear-fishing tip of claim 11, wherein the barb has a cleat located near an axial midpoint of the barb to which the forward end of the tether is anchored.

18. The spear-fishing tip of claim 17, further including a slide ring slidably coupled to the shaft, wherein a rearward end of the tether is attached to the slide ring.

19. The spear-fishing tip of claim 18, wherein the rearward end of the tether passes through the slide ring and has a knot or enlargement preventing it from being pulled out of the slide ring.

20. The spear-fishing tip of claim 11, further comprising an aperture through the shaft that is slightly larger than the diameter of the tether, wherein the forward end of the tether passes through the aperture before being anchored to the barb.

* * * * *